United States Patent

McQueen et al.

[15] 3,689,791

[45] *Sept. 5, 1972

[54] CONVERGENCE ASSEMBLY

[72] Inventors: John McQueen, Bloomfield; Leonard D. Minutillo, Sayreville, both of N.J.

[73] Assignee: Griffith Electronics, Inc., Chicago, Ill.

[ * ] Notice: The portion of the term of this patent subsequent to Dec. 1, 1987, has been disclaimed.

[22] Filed: Oct. 30, 1970

[21] Appl. No.: 85,643

[52] U.S. Cl. ....................313/77
[51] Int. Cl. ....................H01j 29/02, H01j 31/20
[58] Field of Search ....................313/70 C, 169 C, 77

[56] References Cited

UNITED STATES PATENTS 3,544,826 12/1970 McQueen et al. ...........313/77

*Primary Examiner*—Robert Segal
*Attorney*—Ostrolenk, Faber, Gerb & Soffen

[57] ABSTRACT

A convergence assembly for use in color television kinescopes in which the internal pole pieces are secured to the housing thereof by means of an ear or tab portion engaging a slot in the housing and by means of a substantially T-shape arrangement mechanically connected to exert a force on the pole pieces tending to keep them in proper alignment position. An interleaving sheet arrangement is further provided to shield the magnetic field associated with one pole pair from the magnetic field associated with a second such pair.

3 Claims, 7 Drawing Figures

INVENTORS
JOHN McQUEEN
LEONARD D. MINUTILLO
BY
Ostrolenk, Faber, Gerb & Soffen
ATTORNEYS

CONVERGENCE ASSEMBLY

This invention relates to color television picture tubes and, more particularly, to an improved convergence assembly usable therein.

Although the present invention will be described in the context of a tricolor picture tube—reproducing red, green and blue primary colors—, it will be understood that the principles of the invention are equally applicable in a two-color picture tube—reproducing primary colors of orange and cyan.

In color television picture tubes of the shadow-mask variety, it is conventional practice to employ a convergence magnet assembly for the purpose of assuring that the electron beams produced by the electron guns of the tube will strike the phosphor dots of the screen in a cluster and at the same point. Thus, the electron beam emanating from one gun of a tricolor kinescope—for example, the green gun—will strike the screen in the area at which the electron beams from the red and blue guns land. The result is that a compact cluster of red, green and blue dots is lighted, to collectively generate a tiny white spot when viewed from a distance (when the intensities of the beams are of equal magnitude).

The convergence assembly in the tricolor kinescope employs three pairs of internal pole pieces, with each pair being associated with its own external converging magnet. In these and other color television environments, it is essential that the pole pieces be held in exact physical relationship with respect to one another to prevent any drifting apart of the electron beams which would cause mis-registry. If, for example, the blue electron beam is out of alignment, the white spot would take on a yellowish tinge, with a fringe area of blue being present.

The convergence assembly typically comprises a cylindrical housing element, with the pole pieces of each pair extending through the surface of the housing but being secured thereto by a weld or other suitable mechanical connection. Thus, with six pole pieces (i.e., three pole piece pairs), it will be apparent that at least six welds will be needed in order to assure proper positioning. In fact, however, twelve such welds are normally employed—two for each pole piece to further insure the exact positioning of the pole pieces and to further assure exact convergence.

The typical convergence assembly additionally includes a series of internal magnetic shields which separate the convergence assembly into three 120° pie-shaped portions. These shields serve to prevent the magnetic field created by, for example, the green convergence magnet from affecting the field produced by the red convergence magnet. In a typical arrangement, three isolation sheets are employed for the shields, with each being bent at a 120° angle to form a V-shaped configuration and with the ends thereof extending through the side of the cylindrical housing element, again being secured thereto by a weld to insure exact positioning. Thus, for three such isolation sheets, a total of six additional welds would be necessitated.

As a result, it will be seen that eighteen welds or similar mechanical connections are necessary in order to fabricate this convergence assembly.

However, as will be appreciated, these welds take time in the fabrication of the convergence assembly and result in a cost factor which it would be desirable to reduce. Special jigs and/or fixtures would be needed in order to perform the fabrication, not only to weld the pole pieces in place but to bend and weld the isolation shields.

It is an object of the present invention, therefore, to provide an improved and yet inexpensive convergence assembly.

More particularly, it is an object of the invention to provide a convergence assembly requiring less welds in its fabrication than are required by typical prior art arrangements.

It is a further object of the present invention to provide a different isolation sheet arrangement than is provided in the prior art, to not only simplify the means of securing these sheets to the covergence assembly but, at the same time, to reduce the cost involved in the isolation sheet material.

As will become clear hereinafter, a convergence assembly constructed in accordance with the invention includes the same three pairs of internal pole pieces as are employed in prior art assemblies. However, the end of each pole piece which extends through the cylindrical housing for securement thereto is provided with an ear or tab portion which is arranged to fit into a mating slot provided in the housing itself. This serves to limit most of the movement of the internal pole piece. Tofurther secure the pole piece to the cylindrical housing, the snubber spring usually employed in conventional convergence assemblies to fit against the inner wall of the kinescope neck is provided in a T arrangement, with the bar of the T being of a resilient material and constructed to exert a holding force on the end portions of two adjacent pole pieces. The snubber and T arrangement secure the internal pole pieces to the housing with a single weld being placed in the middle of the bar of the T arrangement to serve as the sole means for mechanically connecting the pole pieces to the convergence assembly.

Thus, it will be noted that this type of arrangement permits the previously employed 12 welds needed to secure the three magnetic pole piece pairs to the cylindrical assembly in a tri-color kinescope environment to be replaced by only three such welds.

Considering the second aspect of the invention, wherein the number of separate isolation sheets employed are to be reduced, the invention provides for the use of two such isolation sheets bent in such manner as to maintain the 120° relationship between its respective ends while, at the same time, serving to reduce the number of isolation sheets from three to two. In addition, the manner in which the isolation sheets are so bent serves in one instance to provide a fixed relationship between the isolation sheets and the convergence assembly itself. In a second manner, the end of the isolation sheets are controlled to extend through the cylindrical housing of the convergence assembly and to be bent over in a manner so as to enable a single weld to insure securement to the housing.

Thus, in this manner, not only will the number of isolation sheets be reduced, but the number of welds will be reduced from six to three.

It will, therefore, be seen that a convergence assembly provided in accordance with the invention will be one in which the number of welds needed to fabricate the assembly will be reduced from a total of 18 welds to a total of six. At the same time, the number of isolation sheets will be reduced from three to two. This overall improvement represents a cost savings in manufacture of approximately 5 cents per convergence assembly. Considering the fact that the cost of an assembly itself presently runs about 30 to 35 cents, and that present color television marketing projections call for the manufacture of some 7 million or so tubes per year, the savings effected by the convergence assembly employing the principles of the present invention are extremely significant.

These and other objects of the invention will be more clearly understood from a consideration of the following description taken in accordance with the drawings in which.

Figure 4:
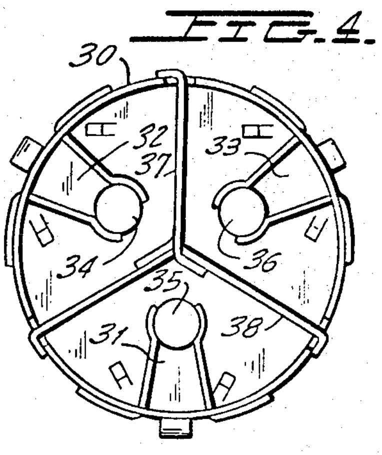
FIG. 4 is a top plan view of the convergence assembly constructed in accordance with the principles of the present invention.
Figure 7:
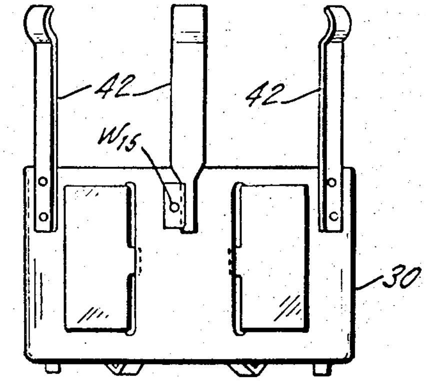
Figure 6:
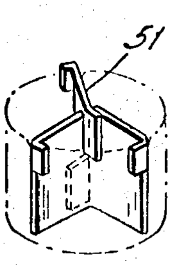

FIG. 6 is a detailed perspective view of the isolation sheets employed in the convergence assembly of FIG. 4, and illustrates the manner in which the isolation sheets are formed to provide securement within the cylindrical housing; and FIG. 7 is another side elevational view of the cylindrical assembly of FIG. 4 showing the manner in which the end portions of the isolation sheets are secured to the cylindrical unit.

Figure 1:
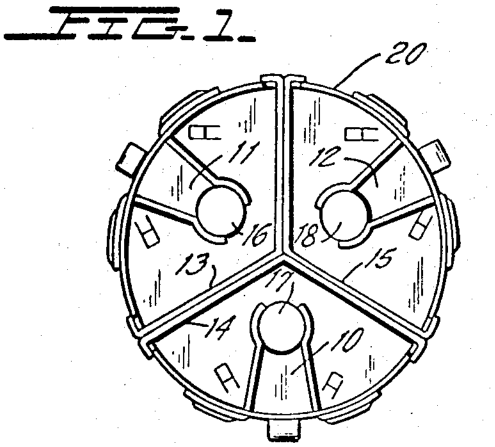
FIG. 1 is a top plan view of a prior art convergence assembly of which the present invention represents an improvement.

Referring now to FIG. 1, the convergence assembly there shown includes a cylindrical housing 20 containing three pairs of internal pole pieces 10, 11 and 12. In a tri-color picture tube, the pole pair 10 may be employed to converge the electron beam associated with the "green" electron gun, whereas the internal pole pairs 11 and 12 may be used to converge the beams emanating from the "red" and "blue" electron guns, respectively.

Three sets of isolation shield sheets 13, 14 and 15 are also included in the convergence assembly and are formed into a 120° angle to provide isolation between the magnetic field of one such pole pair and the magnetic field associated with a second such pole pair. (In this respect, it will be understood that surrounding the cylindrical housing are small static convergence magnets and a dynamic convergence coil which cooperate to establish the magnetic fields which are used to converge the "green", "red" and "blue" electron beams to a cluster on the screen of a cathode ray-tube kinescope.) It will be understood that the openings 16, 17 and 18 in the base 20*a* of housing 20 serve as the entry ports for the electron beams emanating from the electron gun assemblies located behind these orifices, i.e., within the plane of the paper.

Figure 2:
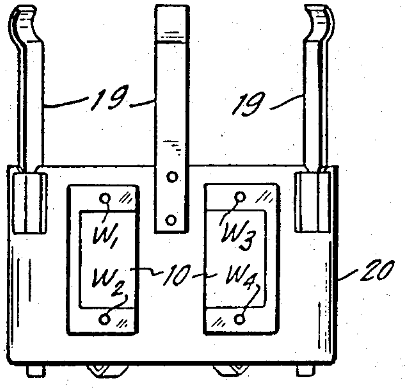
FIG. 2 is a side elevational view of the convergence assembly showing the manner in which the internal pole pieces are secured to the cylindrical unit.

FIG. 2 shows a side elevational view of the convergence assembly of FIG. 1 in which 19 represents the snubber springs which are fitted into the neck of the kinescope (not shown) to hold the convergence and electron gun assemblies in their proper positions. Also noted in FIG. 2 are the number of welds or similar such mechanical connections $W_1$–$W_4$ which serve to secure the flanges 10*a* of the pole piece pair 10 to the cylindrical housing 20. Four such welds are indicated in FIG. 2, and are understood to be associated only with one of the three sets of pole pieces of FIG. 1. Thus a total of 12 welds will be employed in the convergence assembly fabrication in order to secure the three sets of pole pairs 10, 11, 12 to the cylindrical unit 20.

Figure 3:
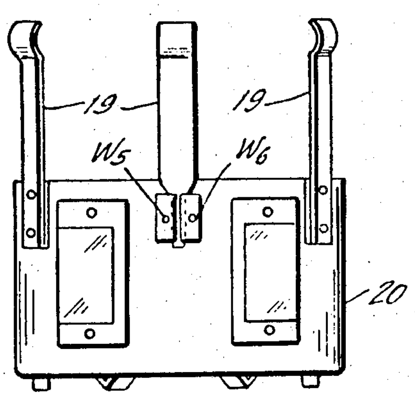
FIG. 3 is an additional side elevational view showing the manner in which the isolation sheets are secured to the cylindrical unit.

FIG. 3 shows an additional side view of the convergence assembly in which the bent tabs 13*a* and 14*a* of two respective isolation sheets 13, 14 are shown as being secured to the cylindrical housing 20 by associated welds $W_5$ and $W_6$. It will also be understood that two such similar welds are associated with the other tabs 13*b* and 14*b* of these isolation sheets 13, 14 and with the remaining tabs 15*a* and 15*b* of isolation sheet 15 to provide a total of six additional welds for the cylindrical unit 20.

Thus, in the construction of the convergence assembly shown in FIGS. 1–3 of the drawings, a total of 18 welds are employed and a total of three isolation sheets are required. The convergence assembly illustrated by these three drawings has had wide acceptance in the manufacture of color television kinescopes, and constitutes the prior art to the present invention.

Referring now to FIG. 4, the front view of the convergence assembly constructed in accordance with the invention there shown also includes a cylindrical housing 30 and three sets of internal pole pairs 31, 32 and 33. The openings 34, 35 and 36 in base 30*a* are provided for passage of the respective three electron beams and are also shown. In addition, the 120° isolation sheet portions 37, 38 and 39 are shown but, as will become clear below, these three portions are formed from only two pieces of material rather than from the previously employed three pieces as in FIG. 1.

Figure 5:
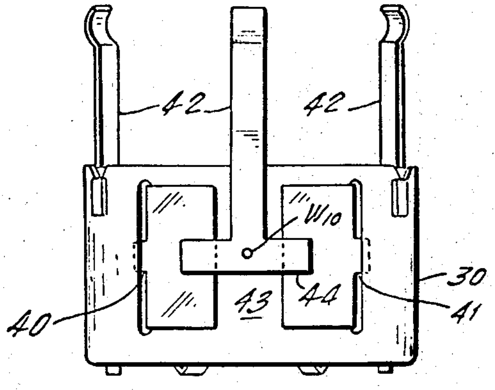
FIG. 5 is a side elevational view of the convergence assembly showing the manner in which the internal pole pieces and the snubber unit are secured to the cylindrical housing.

Referring to FIG. 5, the manner in which the pole piece pairs are secured to the cylindrical housing 30 is shown. Each pole piece flange 31*a* of a pole piece pair 31 is provided with an ear or tab portion 31*b* at the free end of the flanges 31*a*, which tabs are first inserted into slits 30*d* and 30*e* provided in cylindrical housing 30. The cylindrical housing 30 is further provided with slits 30*d* and 30*e* into which the tabs 31*b* are inserted. The snubber spring 42 is a substantially T-shaped component having an integrally formed cross-bar 44 and being formed of a resilient metallic material arranged to exert a holding force upon the flanges of the pole piece portions passing through the cylindrical housing 30. Thus, it will be appreciated that the cross-bar 44 of the T component additionally serves to maintain the magnetic pole pieces in place. In order to provide adequate securement to the cylindrical unit 20, a single weld $W_{10}$ is provided where the snubber spring 42 meets the cross-bar 44 of the T arrangement.

(It will be noted in this respect that the bar 44 of the T arrangement serves to exert an equal force on each one of a magnetic pole pair which, together with the action of the tabs 31*b* fitting into the slots 30*d* and 30*e* of the cylindrical housing 30, serves to maintain the pole pieces in place.)

Thus, it will be seen from FIG. 5 that the number of welds required in the convergence assembly to secure the pole pieces in their proper position is reduced from a total of four welds per pole pair to a total of one weld per pole pair. The number of welds needed to secure the pole pieces to the cylindrical housing in the tri-color kinescope environment is, therefore, reduced from 12 to three.

Referring to FIG. 6, there is shown the manner in which the isolation sheets are formed to provide the necessary shielding within the convergence assembly. As contradistinct to the prior art arrangement of FIGS. 1–3, only two such sheets 37 and 38 are employed instead of the previously employed three sheets 13, 14, 15. As indicated in the drawing, the center of sheet 38 is provided with a slit **38*a* extending from the top towards the bottom approximately one-half the height of sheet 38. The isolation sheet 37 is cut to form tabs 37*a* and 37*b* which are bent to form a 120° angle between tabs 37*a* and 37*b*, between tab 37*a* and main body portion 37*c*, and between tab 37*b* and main body portion 37*c*. Tab 37*a* is inserted into slit 38*a* in isolation sheet 38 and rests against body portion 38*b* of sheet 38, while tab 37*b* rests against body portion 38*c* of sheet 38. This arrangement prevents any relative motion between the isolation sheets 37 and 38, wherein it will be seen that if one such sheet has a tendency to move, it is prevented from doing so by the cooperative action of the slit 38*a* in sheet 38 and by the bent tabs 37*a* and 37*b* of sheet 37**.

FIG. 7 shows the manner in which the isolation sheets 37 and 38 are secured to the cylindrical housing 30. As can clearly be seen, only one weld is employed to secure tab **37*c* to housing 30 and two welds are employed to respectively join tabs 38*d* and 38*e* to cylindrical unit 30, making a total of three welds. Note one such weld, $W_{15}$, for securing tab 38*e* to housing 30**. A total of six welds were required in the prior art arrangement to secure the isolation sheets adequately to the cylindrical housing and to prevent movement between the sheets.

Thus, it will be seen that not only does the present convergence assembly represent a savings in the number of sheets of isolation material employed, but it also represents a savings in reducing the number of welds required in securing the isolation sheets to the assembly from six to three.

It will, therefore, be seen that a convergence assembly constructed in accordance with the invention effects a reduction of the number of welds from a total of 18 to a total of six. At the same time, the convergence assembly represents a unit in which material cost can be reduced, with a further reduction in fabrication cost. These costs, though seeming somewhat inconsequential on a piece-by-piece basis, will be realized to be of great significance when one talks about a manufacturing of some 7 million such units for inclusion in the number of tri-color kinescopes presently planned in the television industry.

Although this invention has been described with respect to particular embodiments, it should be understood that many variations and modifications will now be obvious to those skilled in the art, and, therefore, the scope of this invention is limited not by the specific disclosure herein, but only by the appended claims.

The embodiments of the invention in which an exclusive privilege or property is claimed are defined as follows:

1. A convergence assembly for use in multi-gun color television tubes of the type in which magnetic fields established between individual pairs of pole pieces precisely register a plurality of electron beams in a selected area on a phosphorescent screen of said tube comprising:

a cylindrical housing being open at a first end thereof and being sealed at its opposite end;

said sealed end comprising a substantially flat, circular sheet having a plurality of openings for enabling the passage of an associated electron beam so as to collect and discharge the electron beams passing through each of said apertures and out through the open end of said housing;

said housing cylindrical surface having a plurality of longitudinally aligned slots arranged at spaced intervals about the cylindrical wall;

said pole pieces each having a mounting tab;

the mounting tabs of each of said pole pieces being inserted into an associated slot in said housing cylindrical wall and being bent so as to engage the exterior cylindrical surface of said housing;

a resilient metallic strip being welded at a point intermediate its ends to the exterior cylindrical surface of said housing and having each of its free ends positioned to overlay and exert a downward force on each tab of a pair of adjacent pole pieces.

2. The convergence assembly of claim 1 further comprising a snubber spring provided for facilitating positioning of the convergence assembly within the television tube;

said snubber portion having a first end thereof being integrally joined to the resilient metallic strip so as to form a T-shaped member.

3. A convergence assembly for use in multi-gun color television tubes of the type in which magnetic fields established between individual pairs of pole pieces precisely register a plurality of electron beams in a selected area on a phosphorescent screen of said tube, comprising:

a hollow, cylindrical housing being open at one end thereof and having a circular-shaped base member sealing its opposite end;

said base member being provided with a plurality of apertures for permitting the passage of an electron beam there-through;

said housing having longitudinally aligned slots arranged at spaced intervals about its cylindrical wall;

each of said pole pieces having a mounting tab;

the mounting tabs of each of said pole pieces being inserted through an associated slot in said housing;

means for joining said tabs to the cylindrical surface of said housing;

first and second isolation sheets being mounted wherein said cylindrical housing and being secured thereto for shielding the magnetic field associated with one of said pair of pole piece pairs from the magnetic field associated with another of said pole piece pairs;

said first sheet being bent along an imaginary line located substantially intermediate the ends of the first sheet so as to form first and second walls aligned at an angle of the order of 120°, said first isolation sheet being provided with a slit along said bend;

said second isolation sheet being provided at a first end thereof with first and second tabs each bent at an angle of the order of 120° relative to the main body of the sheet and relative to one another;

one of said tabs being adapted to be inserted through said slit so as to bear against the surface of one of said walls;

the remaining tab being positioned to bear against the surface of the remaining one of said walls;

the free ends of said walls each being provided with a bent tab and the free end of said second isolation sheet being provided with a third bent tab;

said bent tabs of said first isolation sheet and said third bent tab of said second isolation sheet being inserted through associated slots provided in the cylindrical wall of said housing so as to engage the exterior surface of said cylindrical wall;

means for joining said tabs to said housing.

* * * * *